United States Patent [19]

Nodholm

[11] Patent Number: 4,863,595

[45] Date of Patent: Sep. 5, 1989

[54] APPARATUS FOR DEGRADING BIODEGRADABLE MATERIAL

[76] Inventor: Daniel D. Nodholm, 1330 Deer Hollow Blvd., Sarasota, Fla. 34232

[21] Appl. No.: 200,726

[22] Filed: May 31, 1988

[51] Int. Cl.[4] .............................................. C02F 3/22
[52] U.S. Cl. .................... 210/195.3; 210/199; 210/205; 210/219; 210/220; 210/258
[58] Field of Search ................. 210/195.1, 195.3, 199, 210/201, 202, 205, 219, 220, 253-255, 258

[56] References Cited

U.S. PATENT DOCUMENTS

| | | | |
|---|---|---|---|
| 4,006,085 | 2/1977 | Matteson | 210/195.3 |
| 4,087,361 | 5/1978 | Block et al. | 210/199 |
| 4,104,167 | 8/1978 | Besik | 210/195.1 |
| 4,113,619 | 9/1978 | Arrington | 210/195.1 X |
| 4,211,654 | 7/1980 | Weber et al. | 210/202 X |
| 4,302,338 | 11/1981 | Pfohl et al. | 210/199 X |
| 4,405,456 | 9/1983 | Kinzer et al. | 210/202 X |

*Primary Examiner*—Tom Wyse
*Attorney, Agent, or Firm*—A. W. Fisher, III

[57] ABSTRACT

A method and apparatus for degrading biodegradable waste through bioaugmentation, the waste treatment apparatus comprises a waste treatment tank including a multistage waste treatment section and a waste settling section, the multistage waste treatment section comprises a plurality of waste treatment chambers, a blending device to emulsify and aerate the waste in at least one waste treatment chamber, a transport system to selectively supply bacteria to the multistage waste treatment section, to selectively transfer waste and bacteria to and from the multistage waste treatment section and to selectively transport sludge to and from the waste treatment tank and a fluid transfer port formed between the final waste treatment chamber and the waste settling section to transfer reduced waste to the waste settling section, the method comprises reducing the biodegradable waste treatment section aerating and emulsifying the bacteria and waste and selectively circulating the bacteria and waste between the waste treatment chambers and the waste settling section.

21 Claims, 3 Drawing Sheets

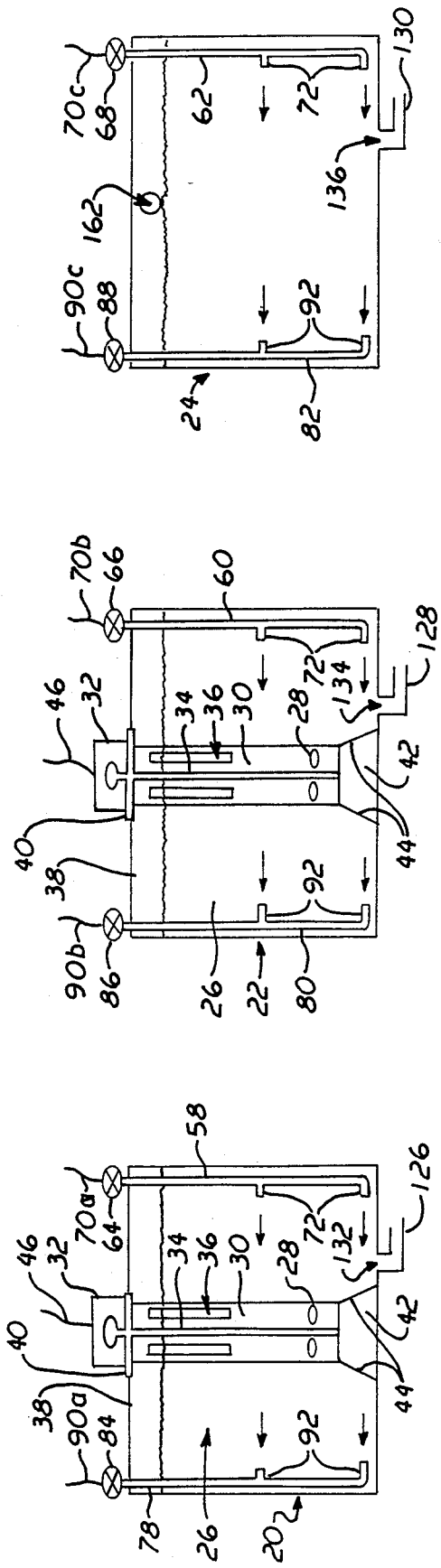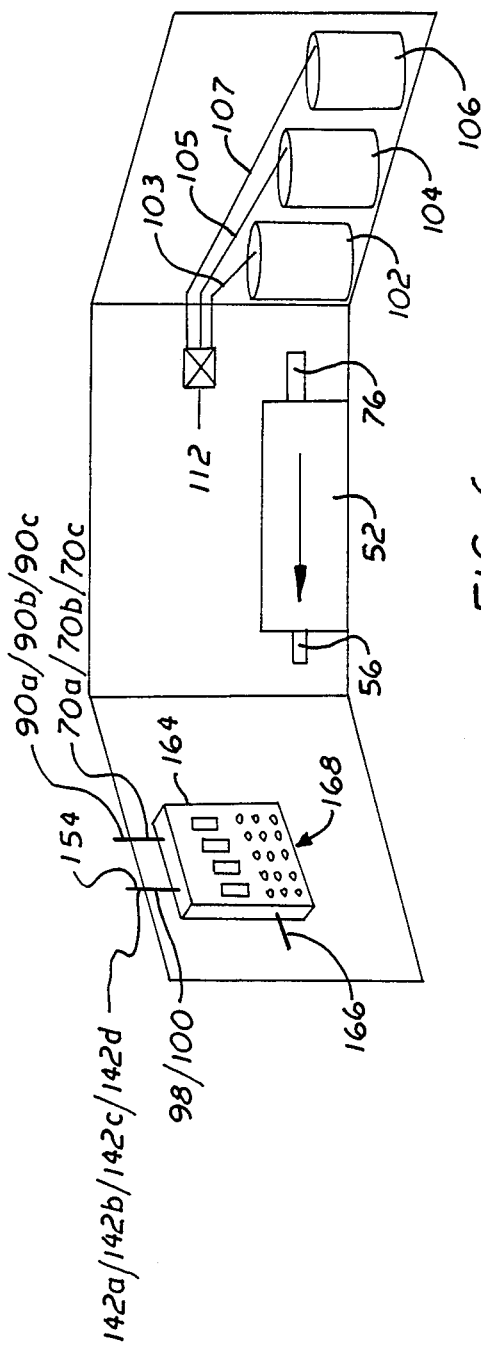

APPARATUS FOR DEGRADING BIODEGRADABLE MATERIAL

BACKGROUND OF THE INVENTION

1. Field of the Invention A method of degrading biodegradable waste through bioaugmentation by transporting the biodegradable waste through a multistage apparatus.

2. Description of the Prior Art

Sewage from residential, commercial and business sources are commonly processed at a central treatment plant where sewage is treated to allow the resulting product to returned to the ecological system. However, if uncontrolled, certain types of sewage high in organic matter such as grease may clog such collection systems. Moreover, pumping stations are frequently used to transport the sewage to the treatment plant. These locations collect grease and other organic matter not decomposed within the water flow. Thus, it is necessary to clean the pumping stations or other junction points in the system where grease and other organic matter collect.

Bacterial augmentation to induce organic degrading has been introduced to reduce or eliminate the need for continuous removal thereof. A bacterial supplement of highly-cultured strains of bacteria for specific organic reduction are employed. These bacterial strains are selected to reduce and convert the grease and other organic matter to lower molecular weight compounds which will not accumulate within the sewage systems.

The anaerobic digestion of materials is discussed by John F. Andrews in "Control Strategies for the Anaerobic Digestion Process, Part I" in Water and Sewage Works, March, 1975. Anaerobic digestion is described as occuring in two steps; the acid fermentation stage and the methane fermentation stage.

In the second stage, highly obligate anaerobes, collectively known as methane formers, are required. The presence of any free or dissolved oxygen will destroy or at least severely inhibit further digestion because of the oxygen-sensitivity of the methane formers. A true anaerobic system must not contain any available or free oxygen.

Andrews reveals that the acid-producing bacteria are less susceptible than the methane bacteria to changes in environmental conditions such as pH, temperature and inhibitory substances. Moreover, because most species of methane bacteria have much lower growth rates than the acid producing bacteria, the rate-limiting step in the overall anaerobic digestion process is the conversion by the methane bacteria of the intermediate products.

Recognizing the methane fermentation stage to be the rate limiting step of the anaerobic digestion process, suggestions have been advanced in the art to accelerate the reaction rates of that step. For example, a two-phase anaerobic digestion process may be used in which the acid and methane formers are provided with optimum environments in separate acid and methane fermentation reactors connected in series.

U.S. Pat. No. 4,094,773 discloses an anaerobic process comprising three steps having progressively higher temperatures for digesting raw household sewage with methane forming bacteria. After a sterilization fourth stage the effluent is treated in a ground filter. Heat is countercurrently transferred from the sterilization stage effluent to the substrate of the digestion stages. The apparatus for carrying out this process has an underlying heat-exchange compartment and four concentric compartments, of which the innermost is the sterilization stage compartment containing a heating means and the outermost compartments are flow chambers for sequentially digesting the sewage prior to sterilizing. Sterilized effluent from the fourth stage passes through the underlying heat-exchange compartment to the bottom of the three concentric flow chambers.

U.S. Pat. No. 4,670,149 shows a bacterial incubator device to facilitate organic reduction of waste materials through the addition of culture strains of bacteria with a high capacity for specific organic reduction. The bacterial incubator device includes an enclosure having a foraminous wall structure packed with high surface area elements to increase the solid bacterial growth surface area.

Additional examples of the prior art are found in U.S. Pat. Nos. 3,957,634; 4,077,877 and 4,587,019.

SUMMARY OF THE INVENTION

The present invention relates to a method of reducing biodegradable waste products such as grease through bioaugmentation by the introduction of specifically trained, highly concentrated bacteria into the biodegradable waste using a waste treatment apparatus.

The waste processing apparatus comprises a waste treatment tank including a multistage waste treatment section including a plurality of waste treatment compartments and a waste settling section.

A blending device is operatively disposed within at least one of the waste treatment compartments to emulsify and aerate the waste disposed therein.

A transport system including a pump comprising means to selectively feed bacteria to the multistage waste treatment section, means to selectively transport waste to and from the multistage waste treatment section and means to transport sludge to and from the waste tank.

Treated waste is fed from a final waste treatment chamber to the waste settling section or recirculated through the multistage waste treatment section.

In operation, biodegradable waste is fed to the initial waste treatment chamber where the waste is mixed, emulsified and aerated by the corresponding mixing/aerating device. A first bacteria mixture is introduced into the initial waste treatment chamber to break down the biodegradable waste through the transport system. Non-biodegradable substances are removed from the initial waste treatment chamber through the transport system.

Normally the biodegradable waste product is then transferred to the succeeding waste treatment chambers through the transport system. The biodegradable waste product may be mixed, emulsified and aerated by the corresponding mixing/aerating device in an intermediate stage. Additional strains of bacteria are added to further breakdown or reduce the biodegradable waste product. A parasite may be added to the final or last waste treatment chamber.

The biodegradable waste product is finally fed to the waste settling section where the bacteria and other settled solids collect at the bottom and the clarified effluent is removed from the upper portion thereof. The settled sludge is then returned to the multistage waste treatment section to be degraded by the bacteria or discharged from the waste treatment apparatus.

3

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 3 is a side view of the initial waste treatment compartment.

FIG. 4 is a side view of the intermediate treatment compartment.

FIG. 5 is a side view of the final waste treatment compartment.

FIG. 6 is a perspective view of the control station.

Similar reference characters refer to similar parts throughout the several views of the drawings.

DETAILED DESCRIPTION OF THE PREFERRED EMBODIMENT

Figure 1:
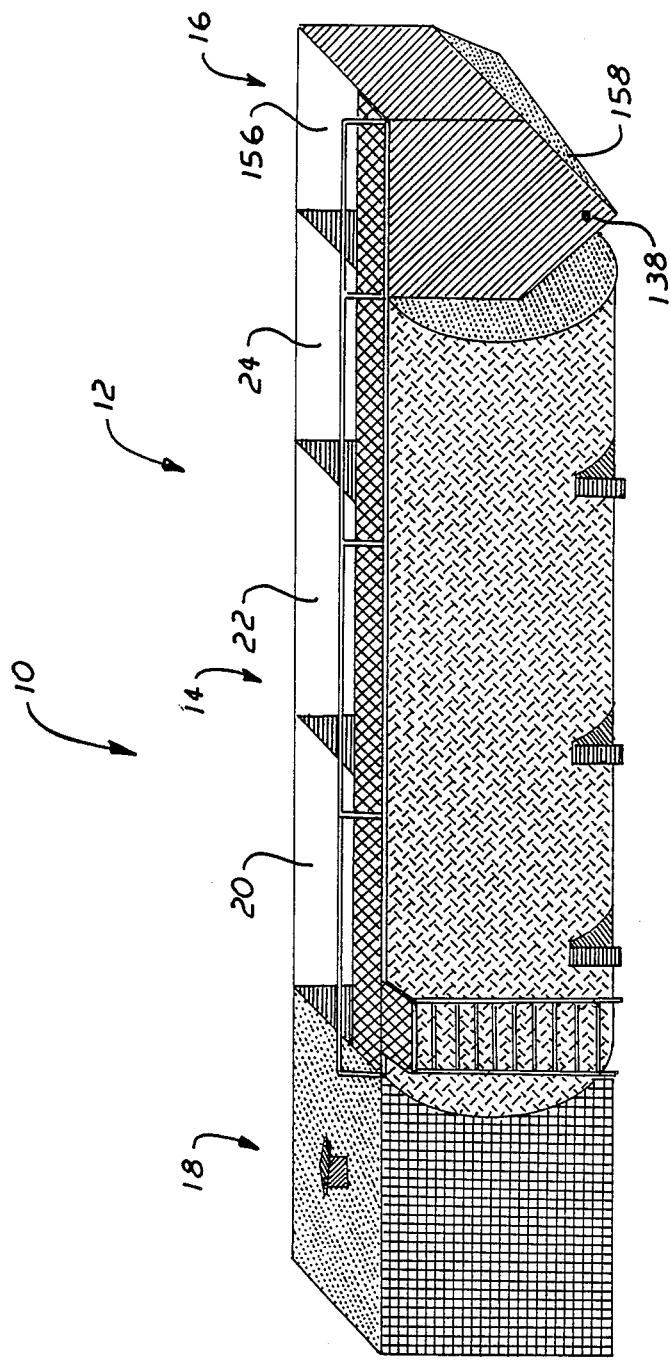
FIG. 1 is a perspective view of the waste treatment tank.
Figure 2:
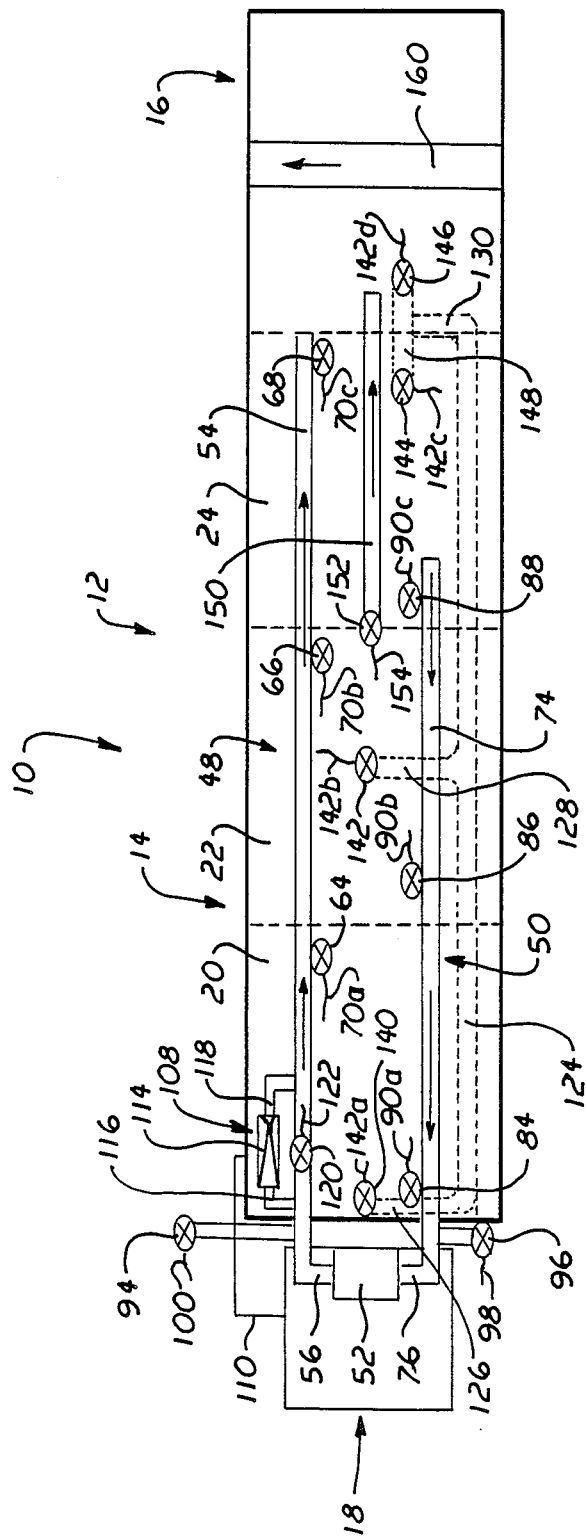
FIG. 2 is a top schematic view of the waste treatment tank and transport system.

The present invention relates to a method and apparatus for reducing biodegradable waste such as grease through bioaugmentation by the introduction of specifically trained, highly concentrated bacteria into the biodegradable waste using the waste treatment apparatus generally indicated as 10 in FIGS. 1 and 2.

The waste treatment apparatus 10 comprises a waste treatment tank generally indicated as 12 including a multistage waste treatment section and a waste settling section generally indicated as 14 and 16 respectively and a control station generally indicated as 18.

As best shown in FIGS. 1 and 2, the multistage waste treatment section 14 comprises an initial, intermediate and final waste treatment compartment indicated as 20, 22 and 24 respectively.

As shown in FIGS. 3 and 4, a blending device generally indicated as 26 is operatively disposed within the initial and intermediate waste treatment compartments 20 and 22. Each blending device 26 comprises at least one mixing element 28 disposed within a hollow housing 30 operatively coupled to a drive means 32 by an interconnecting drive shaft 34. The hollow housing 30 has at least one aeration slot 36 formed in the periphery thereof. Each drive means 32 is operatively mounted on a pair of substantially parallel support members as 38 extending across the top of the waste treatment tank 12 by a substantially horizontal support plate 40. The hollow housing 30 may be supported within the respective waste treatment compartment 20/22 by a support base generally indicated as 42 including a plurality of spaced apart support elements each indicated as 44. Each drive means 32 is connected to the control station 18 by conductor 46.

Aeration is produced by drawing air through the aeration slots 36 formed in the periphery of the hollow housing 30 under the action of the mixing element 28, while mechanical emulsifying is produced by the mixing action of the mixing element 28.

The waste treatment apparatus 10 includes a transport system to selectively supply bacteria and parasites to the multistage waste treatment section 14, to selectively transfer waste to and from the multistage waste treatment section 14 and to transfer sludge to and from the waste treatment tank 12.

As shown in FIG. 2, the transport system includes an inlet and outlet portion generally indicated as 48 and 50 respectively operatively coupled to a circulation pump 52.

As shown in FIG. 2, the inlet portion 48 comprises a main inlet conduit 54 extending between the pump outlet 56 of the circulation pump 52 and the initial, intermediate and final waste treatment chambers, 20, 22 and 24. As shown in FIGS. 3, 4 and 5 respectively, an initial, intermediate and final inlet conduit indicated as 58, 60 and 62 respectively extend between the main inlet conduit 54 and the interior of the initial, intermediate and final waste treatment chambers 20, 22 and 24 respectively through an initial, intermediate and final inlet control valve respectively indicated as 64, 66 and 68 respectively. The initial, intermediate and final inlet control valves 64, 66 and 68 each selectively operable in a first or open position and a second or closed position are coupled to the control station 18 through conductors 70a, 70b and 70c respectively. As shown in FIGS. 3, 4 and 5 respectively, the initial, intermediate and final inlet conduits 58, 60 and 62 extend vertically into the lower portions of the initial, intermediate and final waste treatment chambers 20, 22 and 24 respectively, each having a plurality of inlet ports each indicated as 72 formed vertically along the length thereof.

The outlet portion 50 comprises a main outlet conduit 74 extending between the pump inlet 76 of the circulation pump 52 and the initial, intermediate and final waste treatment chambers, 20, 22 and 24. As shown in FIGS. 3, 4 and 5 respectively, an initial, intermediate and final outlet conduit indicated as 78, 80 and 82 respectively extend between the main outlet conduit 74 and the interior of the initial, intermediate and final waste treatment chambers 20, 22 and 24 respectively through an initial, intermediate and final outlet control valve indicated as 84, 86 and 88 respectively. The initial, intermediate and final outlet control valves 84, 86 and 88 selectively operable in a first or open position and a second or closed position are coupled to the control station 18 through conductors 90a, 90b and 90c respectively. As shown in FIGS. 3, 4 and 5 the initial, intermediate and final outlet conduits 78, 80 an 82 extend vertically into the lower portions of the initial, intermediate and final waste treatment chambers 20, 22 and 24 respectively, each having a plurality of outlet ports each indicated as 92 formed vertically along the length thereof.

As shown in FIG. 2, a main inlet and outlet control valve indicated as 94 and 96 respectively are coupled to the pump inlet 76 and pump outlet 56 respectively. The main inlet and outlet control valves 94 and 96 selectively operable in a first or open position and a second or closed position are coupled to the control station 18 by conductors 8 and 100 respectively.

The means to selectively supply bacteria or parasites to the initial, intermediate and final waste treatment chambers second and third reservoirs or 20, 22, and 24 includes first, containers indicated as 102, 104 and 106 respectively (FIG. coupled to a supply pump means generally indicated as 108 (FIG. 2) through supply conduit 110 through a three position master supply control valve 112 coupled to control station 18 by conductor 113 (FIG. 6). The first, second and third reservoir or containers 102, 104 and 106 are coupled to the master supply control valve 112 through conduits 103, 105 and 107 respectively. The supply pump means may comprise a venturi 114 including an inlet and outlet supply conduit indicated as 116 and 118 respectively and a supply control valve 120 coupled to pump outlet 56. The supply control valve 120 selectively operable between a first or open position and a second or closed position is coupled to the control station 18 through conductor 122.

The means to transfer sludge comprises a sludge conduit 24 coupled between the inlet 76 of the circulation pump 52 and a initial, intermediate and final outlet sludge conduit indicated as 126, 128 and 130 respectively. Flow of sludge from the initial, intermediate and final waste treatment compartment 20, 22 and 24 and waste settling section 16 through a initial, intermediate, final and settling sludge outlet port indicated as 132, 134, 136 and 138 respectively is controlled by a initial, intermediate, final and settling sludge control valve indicated as 140, 142, 144 and 146 respectively. The initial, intermediate, final and settling sludge control valves 140, 142, 144 and 146 operable in a first or open position and a second or closed position are coupled to the control station 18 through conductors 142a, 142b, 142c and 142d respectively. Final and settling sludge outlet ports 136 and 138 are coupled to the final outlet sludge conduit 130 through branch sludge outlet conduit 148.

The transport system further includes a bypass conduit 50 extending between the intermediate waste treatment chamber 22 and the waste settling section 16 to selectively bypass the final waste treatment chamber 24. A bypass control valve 152 selectively operable in a first or open position and a second or closed position is coupled to the control station 18 through conductor 154 to control flow through the bypass conduit 150.

As shown in FIG. 1, the waste settling section 16 comprises a waste settling chamber 156 having a substantially V-shaped bottom 158 and an inclined effluent outlet trough 160 (FIG. 2) disposed in the upper portion thereof. Treated waste flows from the upper portion of final waste treatment chamber 24 to the upper portion of waste settling section 16 through a fluid transfer port 162.

As shown in FIG. 6, the control station 18 includes a control box 164 coupled to an electrical source (not shown) through conductor 166. A plurality of switches generally indicated as 168 is connected to the various control valves to permit remote control thereof. Specifically, the various control valves may be electronically controlled with solenoids or the like to permit flow to the corresponding ports and conduits when in the first or open position. Alternately, the various control valves may be manually controlled.

With the circulation pump 52 operating, biodegradable waste is drawn into the waste treatment apparatus 10 through the main inlet control valve 94 in the first position.

The waste is fed to the initial waste treatment chamber 20 through the main inlet conduit 54 and initial inlet control valve 64 in the first position. A first bacteria such as pseudomones contained in the first reservoir 102 is added to liquid within the initial waste treatment chamber 20 through the venturi 114 with the supply control valve 120 in the second position and the master supply control valve 112 in the first position. The biodegradable waste is emulsified and aerated by the blending device 26 to ensure the proper amount of oxygen for the bacteria. Non-biodegradable substances may be removed from the initial waste treatment chamber 20 through the sludge conduit 124 with the first sludge control valve 140 in the first position for recirculation or to the multistage waste treatment section 14 discharge from the waste treatment apparatus 10 when the main outlet control valve 96 in the first position.

The reduced biodegradable waste is then transferred to the intermediate waste treatment chamber 22 through the initial outlet control valve 84 in the first position, main outlet conduit 74, circulation pump 52, main inlet conduit 54 and intermediate inlet control valve 66 in the first position. A second bacteria such as bacilluis contained in the second reservoir 104 is added to liquid within the intermediate waste treatment chamber 22 through the venturi 114 with the supply control valve 120 in the second position and the master supply control valve 112 in the second position. The biodegradable waste is further emulsified and aerated by the blending device 26 to ensure the proper amount of oxygen for the bacteria to complete the reduction process. Non-biodegradable substances may be removed from the intermediate waste treatment chamber 22 through the sludge conduit 124 with the second sludge control valve 142 in the first position for recirculation to the multistage waste treatment section 14 or discharge from the waste treatment apparatus 10 when the main outlet control valve 96 in the first position.

The reduced biodegradable waste product is then transferred to the final waste treatment chamber 24 through the intermediate outlet control valve 86 in the first position, main outlet conduit 74, circulation pump 52, main inlet conduit 54 and final inlet control valve 68 in the first position. The primary purpose of this stage is to reduce the high concentration of biomass that has accumulated in the first two stages. This is accomplished through the use of a parasite such as genus rhabditis that feeds on other dead cells thereby reducing the biomass significantly. Special bacteria may be added to reduce the biomass accrued from the process and the final product then goes through a polishing chamber where any settlable objects are removed and the clean effluent flows out of the system as described more fully hereinafter. The parasite or third bacteria contained in the third reservoir 106 is added to liquid within the final waste treatment chamber 24 through the venturi 114 with the supply control valve 120 in the second position and the master supply control valve 112 in the third position. Non-biodegradable substances may be removed from the final waste treatment chamber 24 through the sludge conduit 124 with the third sludge control valve 144 in the first position for recirculation to the multistage waste treatment section 14 or discharge from the waste treatment apparatus 10 when the main outlet control valve 96 in the first position.

The contents of the intermediate waste treatment chamber 22 may be fed directly to the waste settling chamber 156 through the bypass conduit 150 when the bypass control valve 152 is in the first position by gravity feed.

Otherwise, the reduced biodegradable waste product is finally transferred to the waste settling chamber 156 through the fluid transfer port 162. Here the bacteria settles to the V-shaped bottom 158 and the cleaner effluent removed through the effluent outlet 160. The settled sludge and other non-biodegradable substances are removed from the waste settling chamber 156 through the sludge conduit 124 with the fourth sludge control valve 146 in the first position for recirculation to the multistage waste treatment section 14 or discharge from the waste treatment apparatus 10 when the main outlet control valve 96 in the first position.

It is envisioned that the supply pump means may comprise a HydroVac to act as a primary or secondary blending device. In addition, the treated effluent may be recirculated to a proceding stage or with the sludge for additional reduction.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A waste treatment apparatus for degrading biodegradable waste through bioaugmentation comprising a waste treatment tank having a main inlet to receive biodegradable waste and an effluent outlet to discharge effluent said waste treatment tank including a multistage waste treatment section and a waste settling section, said multistage waste treatment section comprises a plurality of waste treatment chambers, a blending device to emulsify and aerate the waste in at least one of said waste treatment chamber, a transport system to selectively supply bacteria to said multistage waste treatment section, to selectively transfer waste and bacteria to and from said multistage waste treatment section and to selectively transport sludge to and from said waste treatment tank and a fluid transfer port coupled between a final waste treatment chamber and said waste settling section to transfer treated waste to said waste settling section, said multistage waste treatment section comprises an initial and final waste treatment chamber and said transport system comprises an inlet and outlet portion coupled to a circulating pump having an inlet and outlet port, said inlet portion comprises a main inlet conduit extending between said outlet port of said circulating pump and said initial and final waste treatment chambers, an initial and final inlet conduit extending between said main inlet conduit and said initial and final waste chambers respectively and an initial and final inlet control valve each selectively operable between a first and second position coupled to said initial and final inlet conduits respectively and said outlet portion comprises a main outlet conduit extending between said inlet port of said circulating pump and said initial and final waste treatment chambers, an initial and final outlet conduit extending between said main outlet conduit and said initial and final waste treatment chambers respectively and an initial and final outlet control valve each selectively operable between a first and second position coupled to said initial and final outlet conduits respectively such that when said initial inlet control valve is in said first position waste is fed to said initial waste treatment chamber and when said final inlet control valve is in said first position waste is fed to said final waste treatment chamber, and when said initial outlet control valve is in said first position waste is fed from said initial waste treatment chamber and when said final outlet control valve is in said first position waste is fed from said final waste treatment chamber.

2. The waste treatment apparatus of claim 1 wherein said transport system further includes a supply pump means coupled between said main inlet conduit and a first reservoir containing an initial bacteria therein and a master supply control valve operable in a first position coupled between said supply pump means and said first reservoir to control flow therethrough to said initial waste treatment chamber when said master supply control valve is in said first position.

3. The waste treatment apparatus of claim 2 wherein said transport system further includes a second reservoir containing a final bacteria or parasite coupled to said master supply control valve operable in said first or a second position to control flow therethrough to said final waste treatment chamber when said master supply control valve is in said second position.

4. The waste treat apparatus of claim 2 wherein said blending device comprises a venturi coupled between said outlet port of said circulating pump, said master supply control valve and said main inlet conduit.

5. The waste treatment apparatus of claim 1 wherein said transport system further comprises a sludge conduit extending between said inlet port of said circulating pump and said initial and final waste treatment chambers, an initial and final sludge conduit extending between said sludge conduit and said initial and final waste chambers respectively and an initial and final sludge control valve each selectively operable between a first and second position coupled to said initial and final sludge conduits respectively such that when said initial sludge control valve is in said first position sludge is fed from said initial waste treatment chamber and when said final sludge control valve is in said first position waste is fed from said final waste treatment chamber.

6. A waste treatment apparatus of claim 5 wherein said transport system further comprises a settling sludge control valve selectively operable between a first and second position coupled to said final sludge conduit such that when said settling sludge control valve is in said first position sludge is fed from said waste settling section.

7. The waste treatment apparatus of claim 1 wherein said initial inlet conduit extends vertically into the lower portion of said initial waste treatment chamber having a plurality of inlet ports formed vertically along the length thereof, and said final inlet conduit extends vertically into the lower portion of said final waste treatment chamber having a plurality of inlet ports formed vertically along the length thereof, and said initial outlet conduit extends vertically into the lower portion of said initial waste treatment chamber having a plurality of outlet ports formed vertically along the length thereof, and said final outlet conduit extends vertically into the lower portion of said final waste treatment chamber having a plurality of outlet ports formed vertically along the length thereof.

8. The waste treatment apparatus of claim 1 wherein said initial inlet conduit extends vertically into the lower portion of said initial waste treatment chamber having a plurality of inlet ports formed vertically along the length thereof, and said final inlet conduit extends vertically along the lower portion of said final waste treatment chamber having a plurality of inlet ports formed vertically along the length thereof.

9. The waste treatment apparatus of claim 1 wherein said waste settling section comprises a waste settling section chamber having a substantially V-shaped bottom and an inclined effluent outlet trough disposed in the upper portion thereof.

10. The waste treatment apparatus of claim 1 wherein said blending device comprises at least one mixing element disposed in a hollow housing operatively coupled to a drive means by an interconnecting shaft.

11. The waste treatment apparatus of claim 10 wherein said hollow housing includes at least one aeration slot formed in the periphery thereof.

12. A waste-treatment apparatus for degrading biodegradable waste through bioaugmentation comprising a waste treatment tank having a main inlet to receive biodegradable waste and an effluent outlet to discharge effluent, said waste treatment tank including a multistage waste treatment section and a waste settling section, said multistage waste treatment section comprises a plurality of waste treatment chambers, a blending device to emulsify and aerate the waste in at least one of said waste treatment chamber, a transport system to selectively supply bacteria to said multistage waste treatment section, to selectively transfer waste and bacteria to and from said multistage waste treatment section and to selectively transport sludge to and from said waste treatment tank and a fluid transfer port coupled between a final waste treatment chamber and said waste settling section to transfer treated waste to said waste settling section, said multistage waste treatment section comprises an initial, intermediate and final waste treatment chamber and said transport system comprises an inlet and outlet portion coupled to a circulating pump having an inlet and outlet port, said inlet portion comprises a main inlet conduit extending between said outlet port of said circulating pump and said initial, intermediate and final waste treatment chambers, an initial, intermediate and final inlet conduit extending between said main inlet conduit and said initial, intermediate and final waste chambers respectively and an initial, intermediate and final inlet control valve each selectively operable between a first and second position coupled to said initial, intermediate and final inlet conduits respectively and said outlet portion comprises a main outlet conduit extending between said inlet port of said circulating pump and said initial, intermediate and final waste treatment chambers, an initial, intermediate and final outlet conduit extending between said main outlet conduit and said initial, intermediate and final waste treatment chambers respectively and an initial, intermediate and final outlet control valve each selectively operable between a first and second position coupled to said initial, intermediate and final outlet conduits respectively such that when said initial inlet control valve is in said first position waste is fed to said initial waste treatment chamber, when said intermediate inlet control valve is in said first position waste is fed to said intermediate waste treatment chamber and when said final inlet control valve is in said first position waste is fed to said final waste treatment chamber, and when said initial outlet control valve is in said first position waste is fed from said initial waste treatment chamber, when said intermediate outlet control valve is in said first position waste is fed from said intermediate waste treatment chamber and when said final outlet control valve is in said first position waste is fed from said final waste treatment chamber.

13. The waste treatment apparatus of claim 12 wherein said transport system further includes a supply pump means coupled between said main inlet conduit and a first reservoir containing a first bacterial therein and a master supply control valve operable in a first position coupled between said supply pump means and said first reservoir to control flow therethrough to said initial waste treatment chamber when said master supply control valve is in said first position.

14. The waste treatment apparatus of claim 11 wherein said transport system further includes a second reservoir containing a second bacteria coupled to said master supply control valve operable in said first or a second position to control flow therethrough to said intermediate waste treatment chamber when said master supply control valve is in said second position.

15. The waste treatment apparatus of claim 14 wherein said transport system further includes a third reservoir containing a parasite coupled to said master supply control valve operable in said first, second or third position to control flow therethrough to said final waste treatment chamber when said master supply control valve is in said third position.

16. The waste treatment apparatus of claim 13 wherein said blending device comprises a venturi coupled between said outlet port of said circulating pump, said master supply 17. The waste treatment apparatus of claim 12 wherein said transport system further comprises a sludge extending between said inlet port of said circulating pump and said initial, intermediate and final waste treatment chambers, an initial, intermediate and final sludge extending between said sludge conduit and said initial and final waste chambers respectively and an initial, intermediate and final sludge control valve each selectively operable between a first and second position coupled to said initial, intermediate and final sludge conduits respectively such that when said initial sludge control valve is in said first position sludge is fed from said initial waste treatment chamber, when said intermediate sludge control valve is in said first position sludge is fed from said intermediate waste treatment chamber and when said final sludge control valve is in said first position waste is fed from said final waste treatment chamber.

18. A waste treatment apparatus of claim 17 wherein said said transport system further comprises a settling sludge control valve selectively operable between a first and second position coupled to said final sludge conduit such that when said settling sludge control valve is in said first position sludge is fed from said waste settling section.

19. The waste treatment apparatus of claim 12 wherein initial inlet conduit extends vertically into the lower portion of said initial waste treatment chamber having a plurality of inlet ports formed vertically along the length thereof, said intermediate inlet conduit extends vertically into the lower portion of said intermediate waste treatment chamber having a plurality of inlet ports formed vertically along the length thereof and said final inlet conduit extends vertically into the lower portion of said initial waste treatment chamber having a plurality of inlet ports formed vertically along the length thereof, and said initial outlet conduit extends vertically into the lower portion of said initial waste treatment chamber having a plurality of inlet ports formed vertically along the length thereof, said intermediate outlet conduit extends vertically into the lower portion of said intermediate waste treatment chamber having a plurality of outlet ports formed vertically along the length thereof and said final outlet conduit extends vertically into the lower portion of said final waste treatment chamber having a plurality of outlet ports formed vertically along the length thereof.

20. The waste treatment apparatus of claim 12 wherein said initial inlet conduit extends vertically into the lower portion of said initial waste treatment chamber having a plurality of inlet ports formed vertically along the length thereof, said intermediate inlet conduit extends vertically into the lower portion of said intermediate waste treatment chamber having a plurality of inlet ports formed vertically along the length thereof and said first inlet conduit extends vertically into the lower portion of said final waste treatment chamber having a plurality of inlet ports formed vertically along the length thereof.

21. The waste treatment apparatus of claim 12 wherein said transport system further includes a bypass conduit extending between said intermediate waste treatment chamber said waste settling section and a bypass control valve operable in a first and second position coupled thereto to feed waste from said intermediate waste treatment chamber to said waste settling section when in said first position.

* * * * *